United States Patent Office 3,794,584
Patented Feb. 26, 1974

---

3,794,584
REMOVAL OF POISONS AND DRUGS
FROM BLOOD
Robert Kunin, Yardley, Pa., assignor to Rohm and Haas Company, Philadelphia, Pa.
No Drawing. Filed Apr. 9, 1970, Ser. No. 27,177
Int. Cl. B01d 3/00
U.S. Cl. 210—24      4 Claims

ABSTRACT OF THE DISCLOSURE

A technique is provided for the removal of poisons and/or drugs from the blood of animals. This technique includes the use of a non-ionogenic, macroreticular, cross-linked polymer or resin capable of adsorbing the toxic components from the blood.

---

This invention relates to the removal of poisons and/or drugs which are present in toxic amounts from blood. Every year poisoning from one source or another becomes an increasingly serious public health hazard. This can result from the ingestion of materials which are poisons and which have little or no significant therapeutic value or from an overdose of drugs which drugs have a well-recognized medical or therapeutic value.

Present techniques for the removal of poisons and drugs from the bollod of animals include techniques which act directly on the blood stream or which are designed to prevent or slow down the ingestion of such materials into the blood stream. These techniques include, for example, forced diuresis, gastric lavage, chelates, dialysis, charcoal hemoperfusion, and perfusion through an anion ion exchange resin column. All of these techniques have certain advantages and disadvantages, but probably the most effective one for many poisons and drugs is dialysis. This is particularly true in the case of barbiturate poisoning. While dialysis is an effective technique, it is necessarily limited by the maximal rate of toxins that can diffuse through or across a dialysis membrane. It has now been found that the use of a hemoperfusion or perfusion technique, i.e., a technique wherein blood is perfused through or over a column of an essentially non-ionogenic macroreticular water-soluble cross-linked polymer of certain physical characteristics, hereafter defined in more detail, is very effective in removing poisons and drugs from blood, particularly the barbiturate drugs and non-barbiturate hypnotic drugs such as glutethimide.

The non-ionogenic, macroreticular water-soluble cross-linked polymer or synthetic resin which is useful in the present invention must have a porosity of at least 10%, a specific surface area of at least 10 sq. meters per gram and must not be swollen by the medium with which it will be contacted, so that the substance, in this case the drug or poison, can be adsorbed onto the surface of the resin. The resin or polymer particles are most desirably used in the form of granules or beads and are further, usually, in the range of 16 to 100 mesh particle size (U.S. Standard Screen Series) and more preferably in the form of 20 to 50 mesh beads. For convenience of use the beads are placed or arranged in a column.

Macroreticular resins are characterized by the presence, throughout the polymeric matrix, of a network of "extra-gellular" microchannels or pores. While these micro channels are very small, they are large in comparison with the pores in conventional homogeneous cross-linked gells. Macroreticular resins suitable for use in the present invention may have specific surface areas of up to 2,000 sq. meters per gram or more.

The surface area and porosity (often reported as ml./ml. or cc./cc.) as well as other physical characteristics of macroreticular resins can be measured according to accepted procedures, for example, see pages 152–167 of "Oxidation-Reduction Polymers," Harold G. Cassidy et al., Interscience Pub. N.Y., N.Y., 1965.

The preferred resins are cross-linked resins which have solubility parameters (expressed in the units $$\sqrt{\frac{\text{calories}}{\text{cubic centimetes}}}\,\,)$$

of at least 8.5 and those having such parameters up to 15 or more are satisfactory for use in aqueous systems.

The macroreticular resins empolyed as the drug adsorbents herein are not new compositions of matter in themselves. Any of the known materials of this type are suitable. For example, there may be used granular cross-linked polymers containing from 2 to 100% by weight of units of one or more polyethylenically unsaturated monomers such as macroreticular resins prepared by suspension polymerization of polymerizable ethylenically unsaturated molecules comprising from 2 to 100 weight percent of at least one poly(vinyl)benzene monomer preferably divinylbenzene, trivinylbenzene, alkyldivinylbenzenes having from 1 to 4 ($C_1$ to $C_2$) alkyl groups substituted in the benzene nucleus, or alkyltrivinylbenzenes having 1 to 3 ($C_1$ to $C_2$)-alkyl groups substituted in the benzene nucleus or a mixture thereof. Besides the homopolymers and copolymers of these poly(vinyl) benzene monomers, one or more of them may be copolymerized with up to 98% (by weight of the total monomer mixture) of (1) monoethylenically unsaturated monomers, or (2) polyethylenically unsaturated monomers other than the poly(vinyl)benzenes just defined, or (3) a mixture of (1) and (2) and still result in a suitable macroreticular resin. In order to produce the high porosity and high specific surface areas required of the resins in the present invention, the suspension polymerization procedures of British Pat. 932,126 is preferably employed and the disclosure of the specification of that application is incorporated herein by reference.

Examples of the suitable alkyl-substituted di- and tri-vinylbenzene monomers are the various vinyltoluenes, the divinylxylenes, divinylethylbenzenes, 1,4 - divinyl - 2,3,5, 6 - tetramethylbenzene, 1,3,5 - trivinyl - 2,4,6 - trimethyl-benzene, 1,4 - divinyl, 2,3,6 - triethylbenzene, 1,2,4-trivinyl - 3,5 - diethylbenzene, and 1,3,5 - trivinyl - 2 - methylbenzene.

Examples of other suitable polyethylenically unsaturated monomers referred to above are: divinylpyridine, divinylnaphthalenes, diallyl phthalate, ethylene glycol diacrylate, ethylene glycol dimethacrylate, trimethylolpropane trimethacryate, divinylsulfone, polyvinyl or polyallyl ethers of glycol, of glycerol, of pentaerythritol, of monothio or dithio-derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitrate, triallyl citrate, triallyl phosphate, N,N' - methylenediacrylamide, N,N'-methylenedimethyacrylamide, N,N' - ethylenediacrylamide, trivinylnaphthalenes, and polyvinylanthracenes.

Examples of the suitable monoethylenically unsaturated monomers referred to above are: methyl acrylate, ethyl acrylate, propyl acrylate, isopropyl acrylate, butyl acrylate, tert-butyl acrylate, ethylhexyl acrylate, cyclohexyl acrylate, iso-bornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, and the corresponding esters of methacrylic acid, ethylene, propylene, isobutylene, diisobutylene, styrene vinyltoluene, vinyl chloride, vinyl acetate, vinylidene chloride and acrylonitrile. Polyethylenically unsaturated monomers which contain only one polymerizable ethylenically unsaturated group, such as isoprene, butadiene, and chloroprene, are also to be regarded as falling within the category of monoethylenically unsaturated monomers.

The preferred proportion of the polyethylenically unsaturated cross-linking monomer is from 8 to 50% by weight of the total monomer mixture from which the resin is prepared. Suspension of polymerization usually produces the resin in the form of granules or beads having an overall bead size in the range of about 0.1 to about 3 millimeters average diameter. The bead form of the resin is quite useful for the poison or drug adsorption process of the invention. In this process the material or substance being separated or concentrated is adsorbed on the surface of the resin particles and the effectiveness of the process depends on the presence of a high ratio of surface area to weight of resin.

The drugs or poisons which are readily removed from the blood must be at least partially soluble in an aqueous medium and at least partially lipid soluble, i.e., at least partially soluble in an organic medium such as benzene, chloroform, acetone ether, etc. The poisons and/or drugs which may be removed from blood are further characterized by having in their molecules a hydrophobic portion and a hydrophilic portion which renders them at least partially soluble in an aqueous medium (such as blood) and at least partially lipid soluble. Representative poisons and drugs, which are generally organic in nature and which are susceptible of being removed, include, for example, the various barbiturates such as barbital, phenobarbital, amobarbital, pentobarbital, butabarbital, secobarbital and cyclobarbital. Representative sedatives and/or tranquilizers which are susceptible of being removed are, for example, the piperidinediones such as glutethimide.

In accordance with the present invention, it has been discovered that macroreticular resins of the herein-above class are effective in removing drugs and poisons from blood as evidenced by in vivo tests in dogs. The activity of these resins may be readily demonstrated by animal tests which are known to correlate with similar acivity in man. A preferred macroreticular resin useful in this invention is a copolymer of about 50% divinylbenzene, 41% ethylvinylbenzene, and 9% styrene, all parts being by weight. This resin and its physical properties are more fully described in Example 1 below.

Additional elaboration of the resins useful in the present invention may be obtained by reference to application Ser. No. 612,771, Richard L. Gustafson, now U.S. Pat. No. 3,53,463, or related British Pat. No. 1,129,125.

EXAMPLE 1

A sterile and pyrogen-free copolymer of about 50% divinylbenzene, 41% ethylvinylbenzene and 9% styrene is prepared by suspension polymerization in macroreticular and bead form. The macroreticular copolymer, which is suitable for contact with blood, has the following properties:

| | |
|---|---|
| Porosity (ml. pore/ml. bead) | 0.40–0.45 |
| Surface area (m.²/m.-dry basis) | 290–330 |
| Effective size (mm.) | 0.30–0.45 |
| Harmonic mean particle size (mm.) | 0.45–0.60 |
| Average pore diameter (A.) | 85–90 |
| True wet density (g./ml.) | 1.03 |
| Skeletal density (g./ml.) | 1.06 |
| Bulk density: | |
| (Lbs./ft.³) | 40–44 |
| (G./cc.) | 0.64–0.70 |
| Solubility parameter | 9.1 |

EXAMPLE 2

A sterile and pyrogen-free copolymer of about 97% divinylbenzene and 3% ethylvinylbenzene is prepared by suspension polymerization in macroreticular and bead form. This resin, which may be used for contact with blood to remove poisons and drugs therefrom, has the following properties:

| | |
|---|---|
| Porosity (ml./pore/ml. bead) | 0.55 |
| Surface area (square meters/gram) | 850 |
| Average particle diameter (mm.) | 0.30–0.45 |
| Harmonic mean particle size (mm.) | 0.45–0.60 |
| Average pore diameter (angstrom units) | 50 |
| True wet density (grams/ml.) | 1.06 |
| Skeletal density (grams/ml.) | 1.13 |
| Bulk density: | |
| Pounds/cubic foot | 39 |
| Grams/ml. | 0.63 |

EXAMPLE 3

Another resin which may be used for contact with blood, comprises a macroreticular copolymer of about 20% divinylbenzene, 16% ethylvinylbenzene and 64% styrene.

Utility of macroreticular resins

In using the resins for treatment of blood, it is convenient to place a suitable quantity of the resin, for example, 600 grams of the resin of Example 1, in a column. Arterial blood from dogs which contains sodium pentothal or sodium phenobarbital can be perfused through the column of resin at a flow rate of about 200 ml./min. for 2 hours. The coagulation time of the blood entering the column can be maintained over 30 minutes by infusion of 1,000 units per hour of heparin into the inflow line. The column may be initially primed with 500 ml. of 6% dextran in isotonic saline containing about 1,500 units of heparin. The resin has a particularly adsorptive attraction for the barbiturates and the 2 hour clearance of phenobarbital, for example, by column perfusion of the blood, is significantly greater than that observed with standard coil hemodialysis. There is also a very significant and rapid fall in blood concentration of barbiturate (13.4 to 5.3 mgm. percent during the 2 hour procedure). While the use of the resin during perfusion causes a reduction in leukocytes, this is considered to be transient since it is followed by leukocytosis.

The hemoperfusion system, with a resin such as the resin described in Example 1 above, may also be used to remove other relatively large molecular weight, partially water-soluble and partially lipid-soluble drugs such as glutethimide by adsorption from blood, and such removal is more effective than hemodialysis.

Under certain circumstances and for certain specialized purposes, the non-ionogenic macroreticular resins described above may also be combined or used in conjunction with an anion exchange resin for treatment of blood.

All parts and percentages are given by weight unless otherwise noted.

I claim:

1. In a hemoperfusion resin-column method of removing poisonous or toxic amounts or concentrates of barbiturates and glutethimides from the blood of an animal having said poisonous or toxic amount or concentration in the blood, by perfusing the blood through or over a column of the resin, said perfused blood being suitable for return to the animal with an acceptably lowered level of barbiturate or glutethimide, the improvement which comprises the step of perfusing the blood containing the barbiturate or glutethimide through or over a column of a substantially non-ionogenic macroreticular aromatic cross-linked synthetic resin or polymer in the form of particles or beads, said resin or polymer having a porosity of at least 10% and a specific surface area of at least 10 square meters per gram, whereby the barbiturate or glutethimide is adsorbed onto the surface of the resin or polymer.

2. Method according to claim 1 wherein the crosslinked synthetic resin or polymer has a porosity of about 40 to 45% or 0.40 ml. pore/ml. bead, a surface area of about 290 to about 330 square meters per gram, an average pore diameter of about 85 to about 95 angstrom units, said resin or copolymer being a copolymer of styrene crosslinked with divinylbenzene.

3. Method according to claim 2 wherein the resin or copolymer contains about 50% by weight of divinylbenzene units, the balance being made up of units of a mixture of ethylvinylbenzene and styrene.

4. Method according to claim 1 wherein the crosslinked synthetic resin or polymer has a porosity of about 55% or 0.55 ml. pore/ml. bead, a surface area of about 850 square meters per gram, an average pore diameter of 50 angstrom units, said resin or copolymer containing about 97% divinylbenzene units and about 3% ethylvinylbenzene units.

References Cited

FOREIGN PATENTS 1,129,125  10/1968  Great Britain.

OTHER REFERENCES

Nealon et al.: Jama 197: 158–160, July 11, 1966, "An Extracorporeal Device To Treat Barbiturate Poisoning—Use of Anion Exchange Resins in Dogs."

Palotta et al.: J. Pharmacol Exp. Therap. 128(3): 318–327, March 1960, "The Use of Ion Exchange Resins in the Treatment of Phenobarbital Intoxication in Dogs."

SHEP K. ROSE, Primary Examiner

U.S. Cl. X.R.

23—258.5; 128—214; 195—1.7; 210—22, 321; 424—10, 78, 79, 101

UNITED STATES PATENT OFFICE
CERTIFICATE OF CORRECTION

Patent No. 3,794,584    Dated February 26, 1974

Inventor(s) Robert Kunin

It is certified that error appears in the above-identified patent and that said Letters Patent are hereby corrected as shown below:

Col. 1, line 27, "bollod" should read --blood-- .

Col. 2, line 8, "centimetes" (shown in diagram) should read --centimeter-- .

Col. 2, line 57, "triallyl aconitrate" should read --triallyl aconitate-- .

Col. 2, lines 58-59, "N,N'-methylenedimethyacrylamide" should read --N,N'-methylenedimethacrylamide-- .

Col. 3, line 52, "3,53,463" should read --3,531,463-- .

Col. 3, line 58, "The" should read --This-- .

Col. 3, line 62, "($m^2$/m.-dry basis)" should read --($m^2$/g.-dry basis)-- .

Col. 3, line 65, and

"85-90" should read --85-95--.

Signed and sealed this 24th day of September 1974.

(SEAL)
Attest:

McCOY M. GIBSON JR.
Attesting Officer

C. MARSHALL DANN
Commissioner of Patents